(12) United States Patent
Clausen

(10) Patent No.: US 7,854,332 B1
(45) Date of Patent: Dec. 21, 2010

(54) HIGH-DENSITY DISK STORAGE AND RETRIEVAL CYLINDER

(76) Inventor: Mark Kirqiss Clausen, 1411 N. 58th St., Milwaukee, WI (US) 53208

( * ) Notice: Subject to any disclaimer, the term of this patent is extended or adjusted under 35 U.S.C. 154(b) by 961 days.

(21) Appl. No.: 11/486,355

(22) Filed: Jul. 13, 2006

Related U.S. Application Data

(60) Provisional application No. 60/699,149, filed on Jul. 14, 2005.

(51) Int. Cl.
*A47G 29/00* (2006.01)
(52) U.S. Cl. .................................. 211/41.12; 312/9.46
(58) Field of Classification Search ............... 211/1.53, 211/40, 41.1, 41.12, 56, 58, 63, 70, 129.1, 211/131.1, 163, 196, 205; 206/303, 307, 206/307.1, 308.1, 309, 445, 449, 499, 503; D6/630; 312/9.11, 9.12, 9.15, 9.26, 9.31, 312/9.45, 9.46; 369/30.41, 30.52, 30.61, 369/30.62, 30.66, 30.77, 30.86; 360/92.1; 221/113, 119–122
See application file for complete search history.

(56) References Cited

U.S. PATENT DOCUMENTS

| | | | | |
|---|---|---|---|---|
| 790,440 A * | 5/1905 | Klein | ........................... | 211/45 |
| 816,975 A * | 4/1906 | Gilbert | ........................ | 221/113 |
| 1,069,294 A * | 8/1913 | Rose | ........................ | 312/9.48 |
| 1,381,525 A * | 6/1921 | Wagoner et al. | ............... | 211/40 |
| 1,419,487 A * | 6/1922 | Blocker | ....................... | 312/9.46 |
| 1,432,277 A * | 10/1922 | Cahusac | ....................... | 211/56 |
| 1,549,467 A * | 8/1925 | Dumond et al. | ............. | 312/9.46 |
| 2,318,081 A * | 5/1943 | Kerry | ......................... | 211/70.6 |
| 2,443,320 A * | 6/1948 | Meyer et al. | .................. | 211/56 |
| 2,581,547 A * | 1/1952 | Martini | ....................... | 312/9.46 |
| 2,690,843 A * | 10/1954 | Ament | ......................... | 211/40 |
| 3,104,028 A * | 9/1963 | Brown | ........................... | 221/86 |
| 3,255,890 A * | 6/1966 | Gerber | ........................ | 211/163 |
| 3,337,059 A * | 8/1967 | Le Hoy | ........................ | 211/107 |
| 3,692,376 A * | 9/1972 | McKinsey et al. | ........... | 312/9.46 |
| 3,938,665 A * | 2/1976 | Rumble | ......................... | 211/4 |
| 3,976,301 A * | 8/1976 | Corbett et al. | ............. | 369/35.01 |
| 3,982,633 A * | 9/1976 | Pennington | ..................... | 211/4 |
| 4,014,437 A * | 3/1977 | Rumble et al. | ................... | 211/4 |
| D250,791 S * | 1/1979 | Mauri | ........................... | D6/629 |
| 4,221,440 A * | 9/1980 | Morgan | ...................... | 312/9.45 |
| 4,438,853 A * | 3/1984 | Numbers | ........................ | 211/77 |
| 4,548,324 A * | 10/1985 | Mackey, Jr. | .................... | 211/58 |
| 4,580,685 A * | 4/1986 | Jorquez | .......................... | 211/56 |
| 4,608,679 A * | 8/1986 | Rudy et al. | ................ | 369/30.43 |
| 4,653,649 A * | 3/1987 | Holdredge, Jr. | ............ | 211/41.12 |
| 4,668,150 A | 5/1987 | Blumberg | | |
| 4,670,866 A * | 6/1987 | Hasegawa et al. | ........... | 369/30.86 |
| 4,802,587 A * | 2/1989 | Armijo et al. | ............. | 206/308.3 |
| 4,809,877 A * | 3/1989 | Albright | ........................ | 227/75 |
| 4,826,261 A * | 5/1989 | Nademlejnsky | ............. | 312/9.46 |
| 4,860,876 A | 8/1989 | Moore | | |

(Continued)

*Primary Examiner*—Michael Safavi
*Assistant Examiner*—Joshua Rodden

(57) ABSTRACT

This invention provides high-density storage for data storage media such as compact disks (CDs), digital video disks (DVDs), and similarly shaped objects. The design consists of horizontal storage pockets within a storage cylinder. Multiple pockets lie on a horizontal plane, and each pocket has a pocket opening on the perimeter of the storage cylinder. The pocket openings on each horizontal plane are shifted with respect to the pocket opening below it creating a spiral storage pattern around the periphery of the storage cylinder. Pocket openings are centered on notches that run vertically along the cylindrical perimeter of the cylinder.

6 Claims, 12 Drawing Sheets

U.S. PATENT DOCUMENTS

| | | | |
|---|---|---|---|
| 4,871,086 A | 10/1989 | Davies | |
| 4,893,727 A | 1/1990 | Near | |
| 4,907,889 A * | 3/1990 | Simone | 360/92.1 |
| 4,938,549 A * | 7/1990 | Potter | 312/305 |
| 5,020,043 A * | 5/1991 | Kohler | 369/30.33 |
| 5,033,038 A * | 7/1991 | Kobayashi et al. | 369/30.43 |
| 5,146,451 A * | 9/1992 | Kang | 720/700 |
| 5,176,264 A * | 1/1993 | De Palma | 211/40 |
| 5,212,649 A * | 5/1993 | Pelletier et al. | 700/243 |
| 5,285,333 A | 2/1994 | Barr | |
| 5,319,621 A * | 6/1994 | Amar | 369/30.33 |
| 5,337,920 A * | 8/1994 | Clausen | 221/5 |
| 5,385,397 A * | 1/1995 | Chow | 312/9.45 |
| 5,427,489 A | 6/1995 | Chalmers | |
| 5,541,897 A * | 7/1996 | Baca et al. | 369/30.92 |
| 5,607,065 A | 3/1997 | Todd | |
| 5,651,595 A * | 7/1997 | Willis | 312/249.2 |
| 5,669,494 A * | 9/1997 | Geffen | 358/1.15 |
| D385,744 S * | 11/1997 | Boothe | D6/630 |
| 5,697,684 A * | 12/1997 | Gyovai | 312/9.42 |
| 5,718,339 A * | 2/1998 | Woodruff | 211/41.12 |
| 5,764,615 A * | 6/1998 | Ware et al. | 369/30.57 |
| 5,777,958 A * | 7/1998 | Matumoto et al. | 369/31.01 |
| 5,813,740 A * | 9/1998 | Chang | 312/223.2 |
| D404,958 S * | 2/1999 | Cheris et al. | D6/630 |
| 5,870,357 A | 2/1999 | Dondero | |
| 5,927,544 A | 7/1999 | Kanoh | |
| 6,072,766 A * | 6/2000 | Konshak | 369/30.5 |
| 6,075,758 A * | 6/2000 | Wu | 369/30.52 |
| 6,088,305 A * | 7/2000 | Meadows | 369/30.63 |
| D429,107 S * | 8/2000 | Boothe | D6/630 |
| 6,152,548 A * | 11/2000 | McCracken | 312/9.48 |
| 6,163,511 A * | 12/2000 | De Vries | 369/30.77 |
| D438,049 S * | 2/2001 | Demeter | D6/630 |
| 6,188,032 B1 * | 2/2001 | Hartman | 206/308.1 |
| 6,189,710 B1 * | 2/2001 | Mason | 211/131.1 |
| 6,215,264 B1 * | 4/2001 | Ma | 318/293 |
| 6,732,860 B1 * | 5/2004 | Stridal et al. | 206/308.1 |
| 6,766,910 B1 * | 7/2004 | Kelly et al. | 211/40 |
| 6,912,775 B1 * | 7/2005 | Pfeiffer et al. | 29/729 |
| 6,951,374 B2 * | 10/2005 | Swenson | 312/285 |
| 7,001,003 B1 * | 2/2006 | Stone | 312/285 |
| D519,301 S * | 4/2006 | Gardner | D6/455 |
| 7,151,718 B2 * | 12/2006 | Schumacher | 369/30.33 |
| 2004/0112853 A1 * | 6/2004 | DeNatale, Jr. | 211/163 |

* cited by examiner

Fig 7: Schematic Diagram of Electronic Components

HIGH-DENSITY DISK STORAGE AND RETRIEVAL CYLINDER

CROSS REFERENCE TO RELATED APPLICATIONS

This application claims the benefit of U.S. Provisional Application No. 60/699,149 filed Jul. 14, 2005.

FEDERALLY SPONSORED RESEARCH

Not Applicable

SEQUENCE LISTING OR PROGRAM

Not Applicable

FIELD OF THE INVENTION

This invention relates to high-density storage of Digital Video Disks (DVDs) and other similarly shaped objects and their access and retrieval from such storage devices.

BACKGROUND OF THE INVENTION

This invention provides a high-density disk storage and retrieval cylinder that occupies minimal floor space. By combining overlapping spiral storage within a storage cylinder with motorized positioning and electronic control circuits, it may serve as a disk vending or rental machine or as a general-purpose disk storage and retrieval machine.

Movies stored on DVDs are a popular source of entertainment. One rents them from a variety of locations by simply charging the transaction to a bankcard. In this manner, a customer may enjoy a movie of his choice for a modest fee and return it at his convenience. Owners of such kiosks often locate their units in grocery stores, fast food restaurants, or any place frequented by large numbers of people. Customers enjoy the convenience of renting a movie of their choice, and storeowners appreciate the additional traffic. It's a win-win situation for both customers and proprietors. The only drawback to the customer is the possibility of not finding the desired movie. To the storeowner, the only problem with such kiosks is the occupied floor area—floor area that might be used for additional sales products. This invention solves both problems.

Typically, DVD kiosks hold between 200 and 700 DVDs. Since customers rent the most popular movies first, late customers often must forego seeing the movie of their choice. This invention stores approximately 2400 DVDs, thus greatly decreasing the risk of not having a customer's movie selection. Further, with floor space at a premium, this invention provides additional storage without decreasing floor space for other sales items.

Reliability is another important factor in DVD sales and rentals. When a kiosk is not operational, no sales occur. Since reliability increases as the number of moving parts decrease, this invention with fewer parts should be more reliable and cost effective. Most kiosks use a complex mechanical procedure to move a disk from its storage area to a single location for customer access. This invention moves the access slot to the disk location, eliminating much of the mechanical access and retrieval hardware. By allowing customers to remove the disk manually, this invention simplifies access and retrieval, lowers manufacturing costs, and decreases mechanical failures.

RELEVANT PRIOR ART

Many previous inventions provide storage and retrieval of digital media, but this invention greatly increases storage capacity and ease of operation. Not only does this invention provide high-density storage and retrieval of DVDs and other similarly shaped objects, it does so with a minimal footprint and with a high degree of mechanical reliability. This invention achieves these qualities by: (1) spirally overlapping the storage of DVDs within a storage cylinder, (2) using a moveable access panel for automated selection, and (3) providing enough space between the disks for manual access and retrieval. No other inventors have used these methods.

Of all the other prior art, only Todd's invention has overlapping storage with multiple access slots. He can do this because his spacing between objects at an access point is approximately the thickness of one stored object. Moreover, since his objects are stored in plastic cases, they provide enough width to provide manual access. His pattern repeats every other object. The current invention repeats every fifth object. In a 5 ft vertical column, Todd's invention holds 240 stored objects within approximately a 1 $ft^2$ footprint. The current invention stores about 2400 objects within a 5 ft column on an approximate 2 $ft^2$ footprint—fivefold increase in storage density. Furthermore, Todd provides no automated selection of stored objects. Table 1 compares the relative merits of the current invention to the relevant prior art.

TABLE 1

A comparison of this invention to the prior art.

| Name, Date Pat. No. | High Density Storage | Foot Print | Mechanical Reliability |
|---|---|---|---|
| Clausen, Mark, K.: (This Invention) | Yes | Minimal | High |
| Blumberg, Marvin R.: May 26, 1987 No. 4,668,150 | No | Medium | Medium |
| Moore, William A.: Aug. 29, 1989 No. 4,860,876 | No | Large | Low |
| Davies, Robert: Oct. 3, 1989 No. 4,871,086 | No | Medium | Medium |
| Near, Michael A.: Jan. 16, 1990 No. 4,893,727 | No | Large | Medium |
| Barr, Valerie H.: Feb. 8, 1994 No. 5,285,333 | No | Large | Medium |
| Chalmers, Dennis W.: Jun. 27, 1995 No. 5,427,489 | No | Medium | High |
| Todd, Michael L.: Mar. 4, 1997 No. 5,607,065 | No | Minimal | N/A |
| Dondero, Paul: Feb. 9, 1999 No. 5,870,357 | No | Large | Medium |
| Kanoh, Chiyuki: Jul. 27, 1999 No. 5,927,544 | No | Large | Low |

OBJECTS AND ADVANTAGES

This invention stores digital media spirally about a cylindrical column. This unique design provides high-density storage with minimal footprint, a great benefit to storeowners or to anyone with limited floor space. Secondly, it simplifies the selection process by bringing the storage location to the user, rather than vice versa. By simplifying the selection process, this invention reduces manufacturing costs and improves machine reliability. Finally, the unit allows for manual rather than mechanical insertion or removal. Manual removal and insertion provide a simple low-technology method to vend and retrieve disks.

DRAWINGS—FIGURES

Figure 3A:
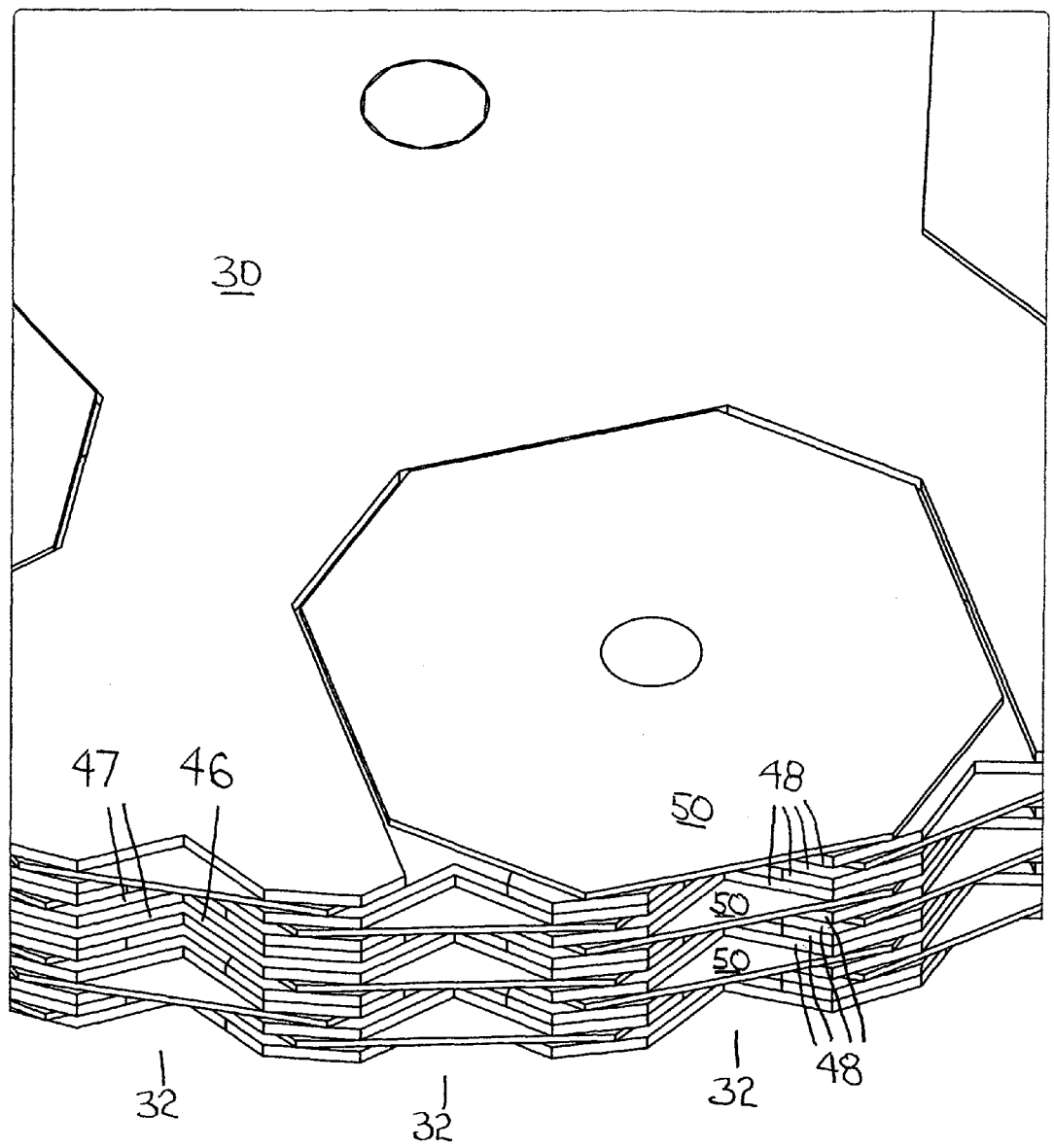

FIG. 3A reveals a detailed partial view of 15 of the storage elements that make up the storage cylinder, showing a few of the 25 vertical slots.

Figure 3B:
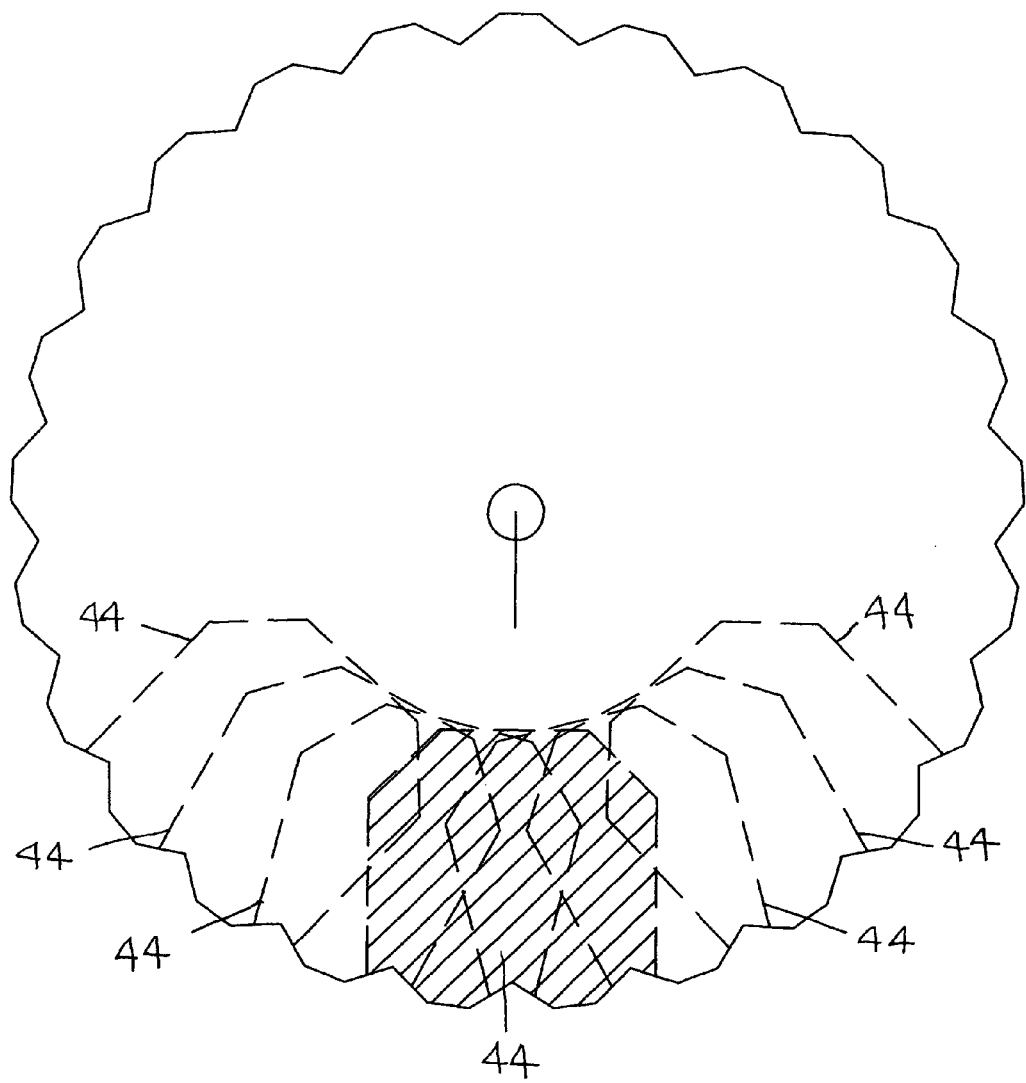

FIG. 3B shows a top view of overlapping storage pockets.

Figure 4:
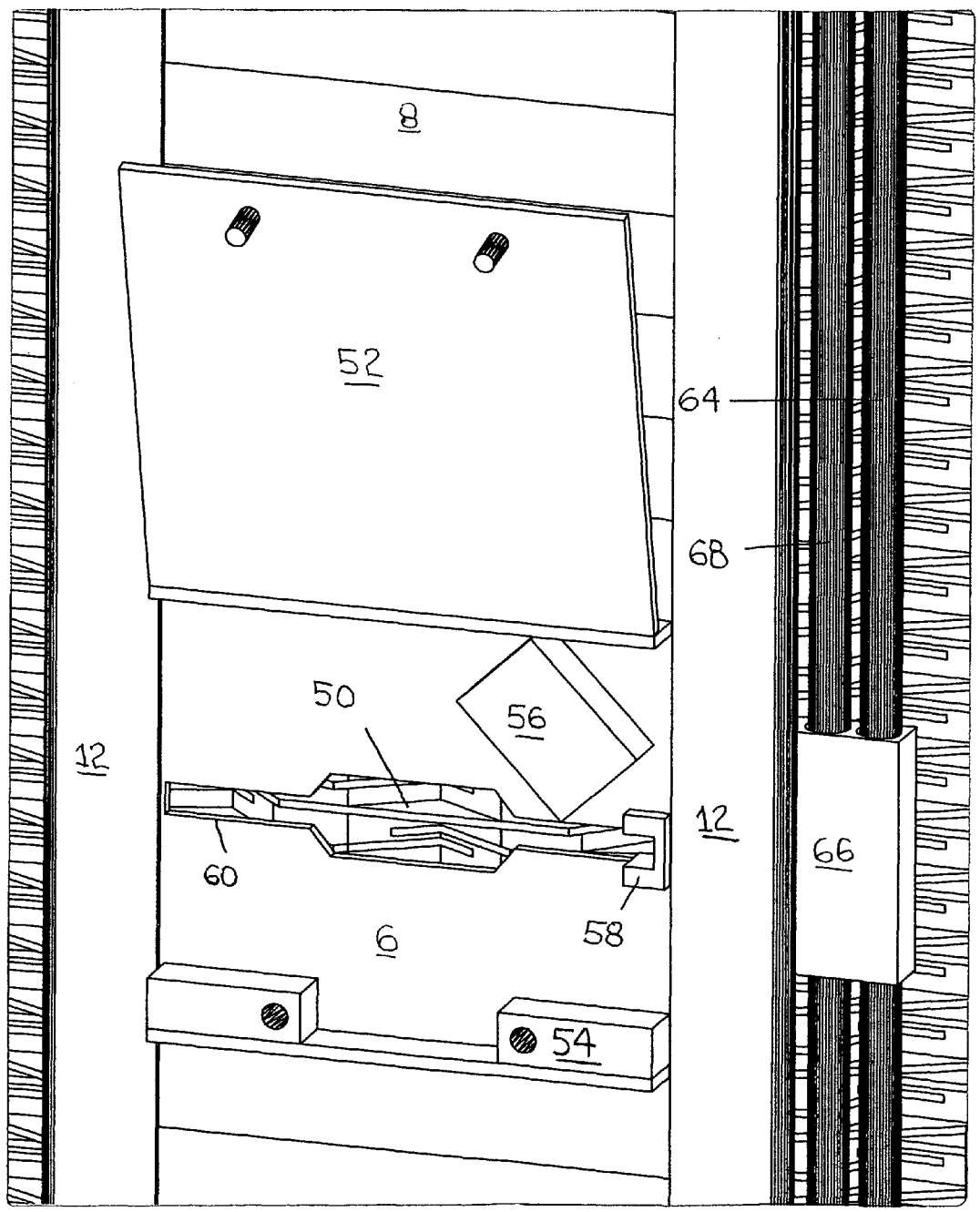

FIG. 4 shows a detailed perspective view of part of the access panel assembly.

Figure 5:
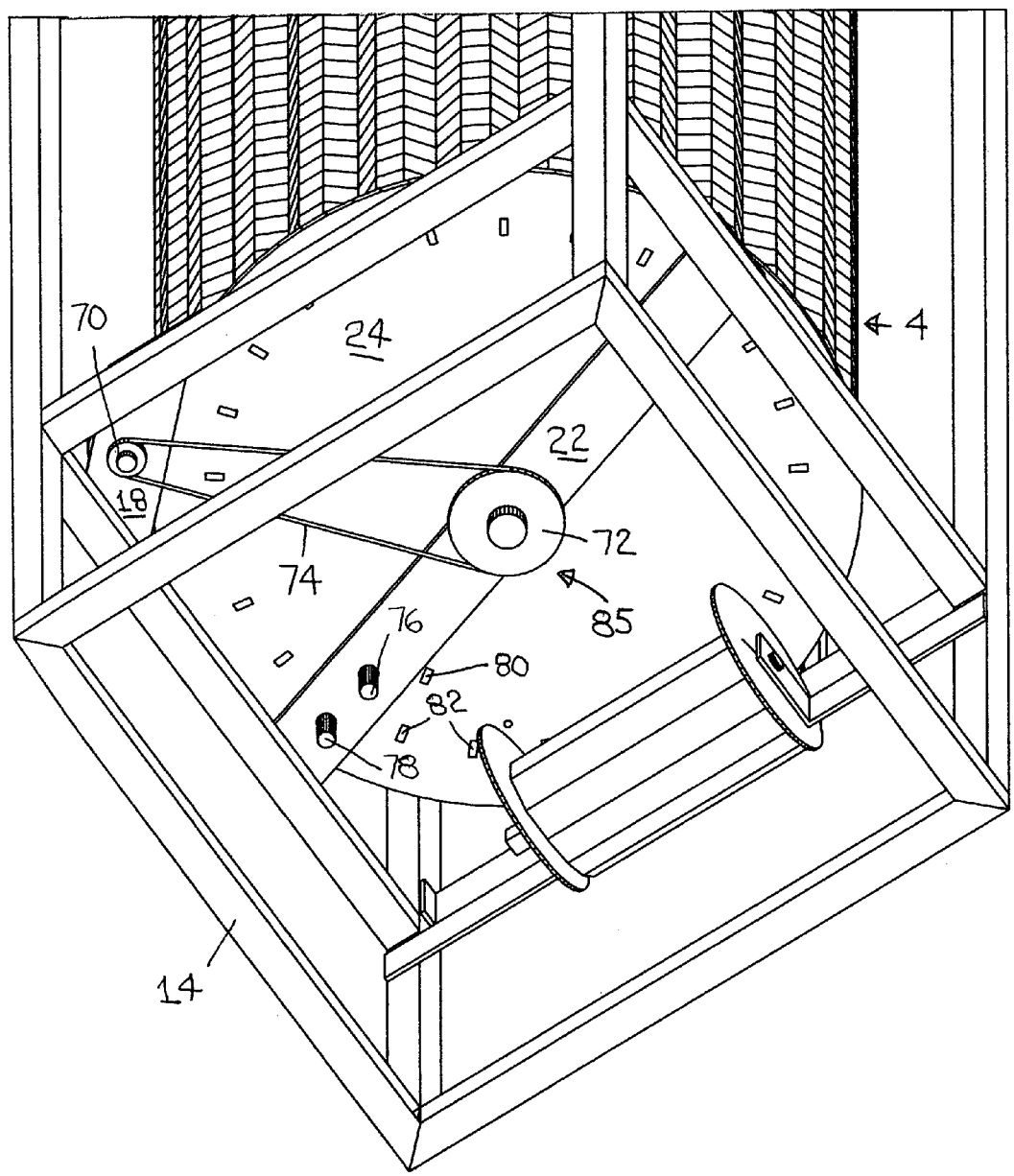

FIG. 5 provides a perspective view of the bottom of the storage unit, showing the cylinder motor, chain, and cylinder sensors.

Figure 6:
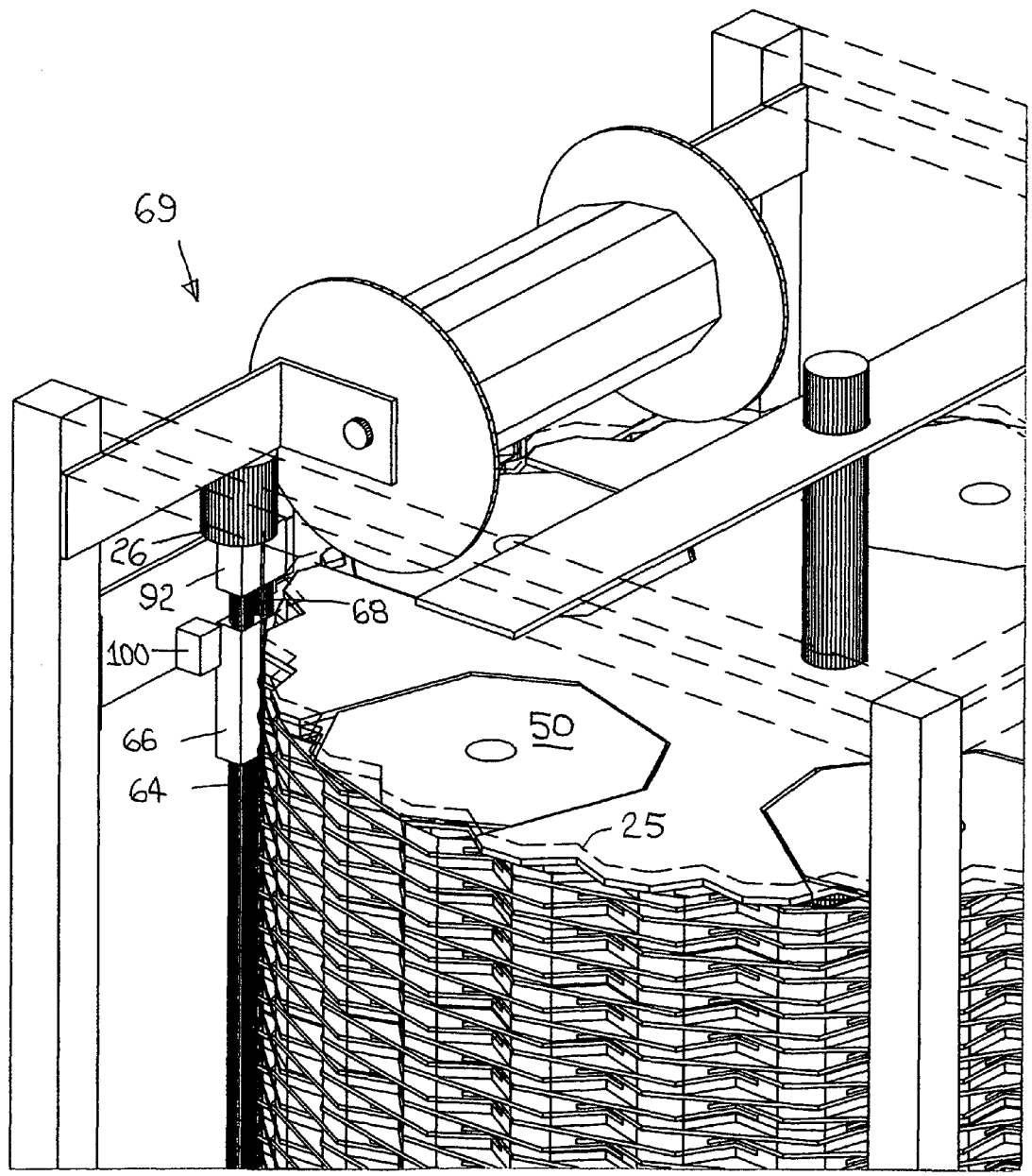

FIG. 6 reveals a perspective view of the top part of the storage unit, showing the access panel motor and limit sensor.

Figure 7:
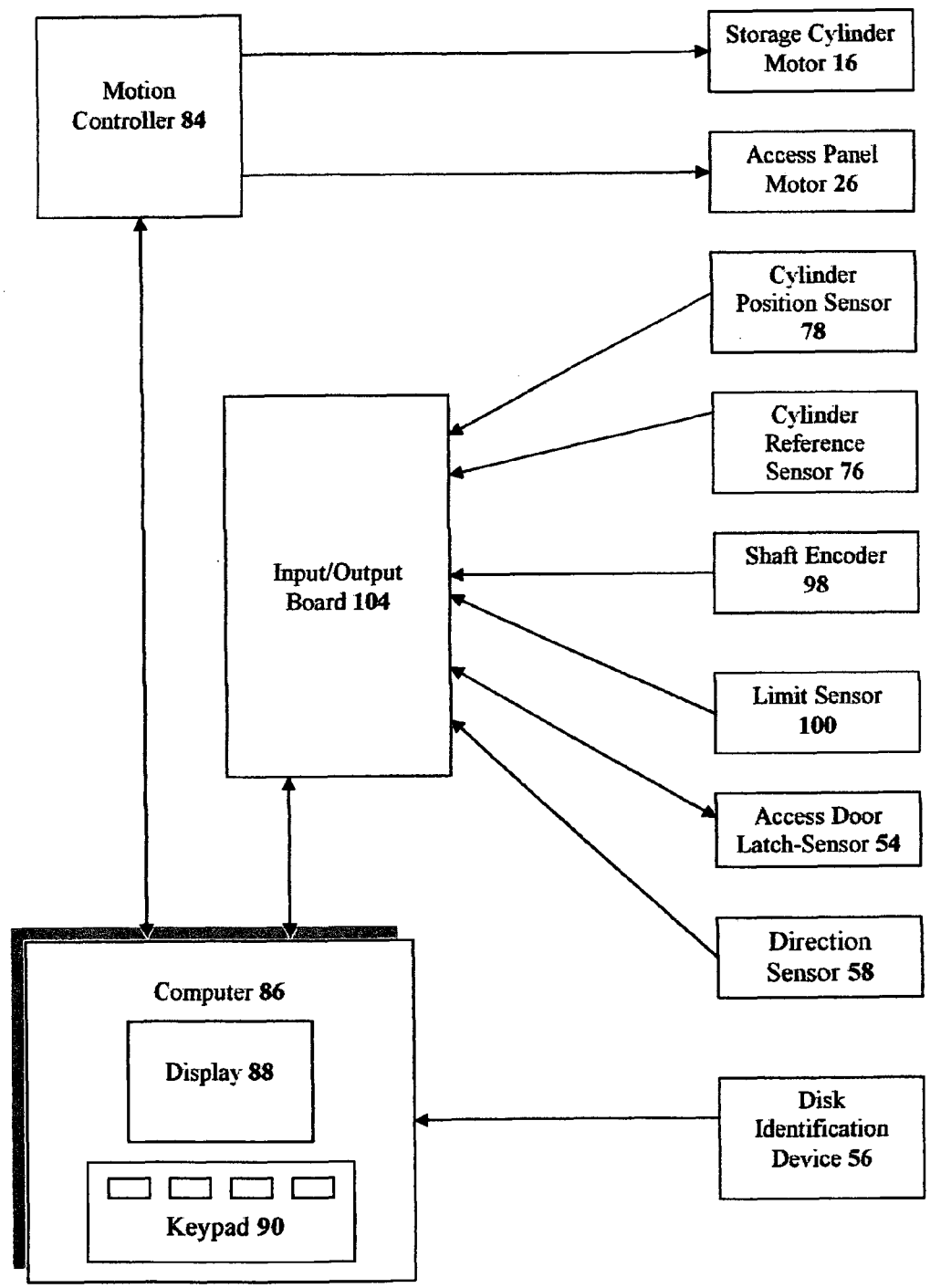

FIG. 7 shows a high-level schematic of the electronic components.

Figure 8:
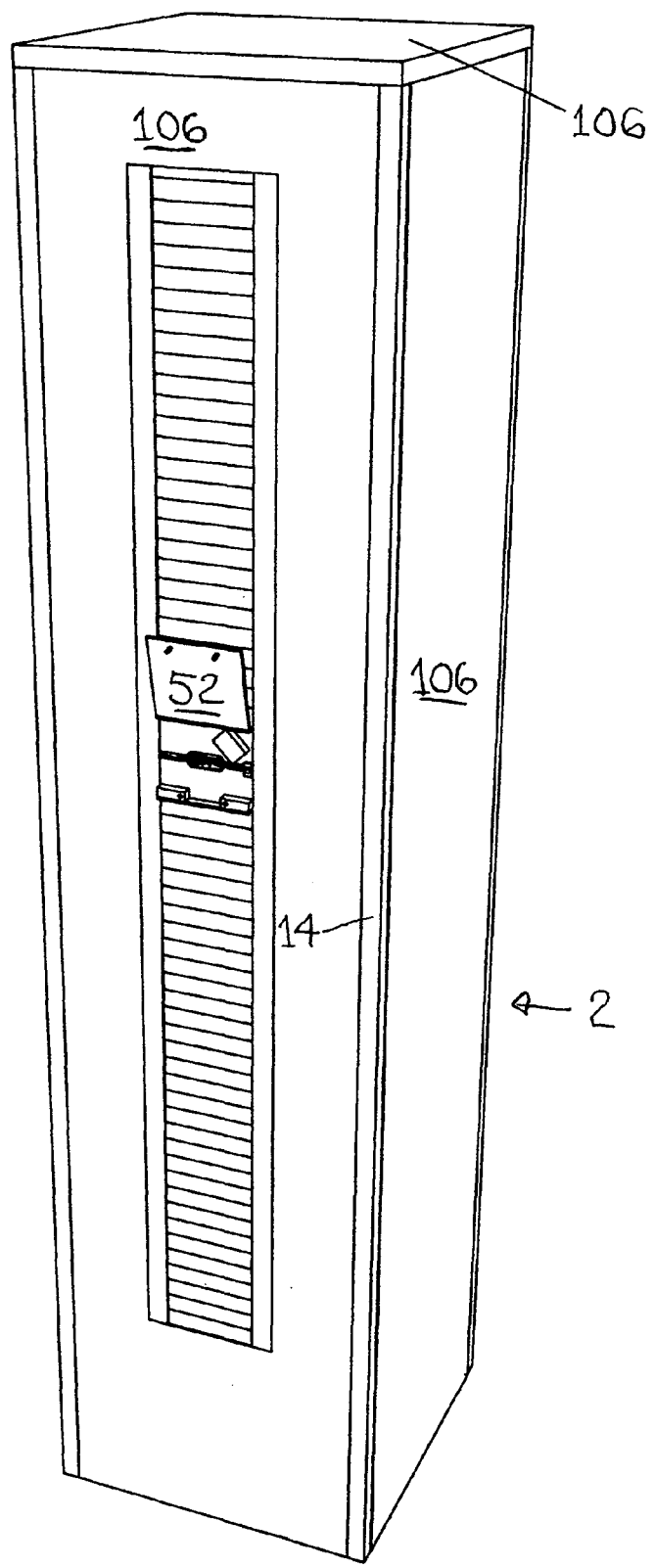

FIG. 8 shows a perspective view of the disk storage unit with the access panel door open and with walls.

Figure 9:
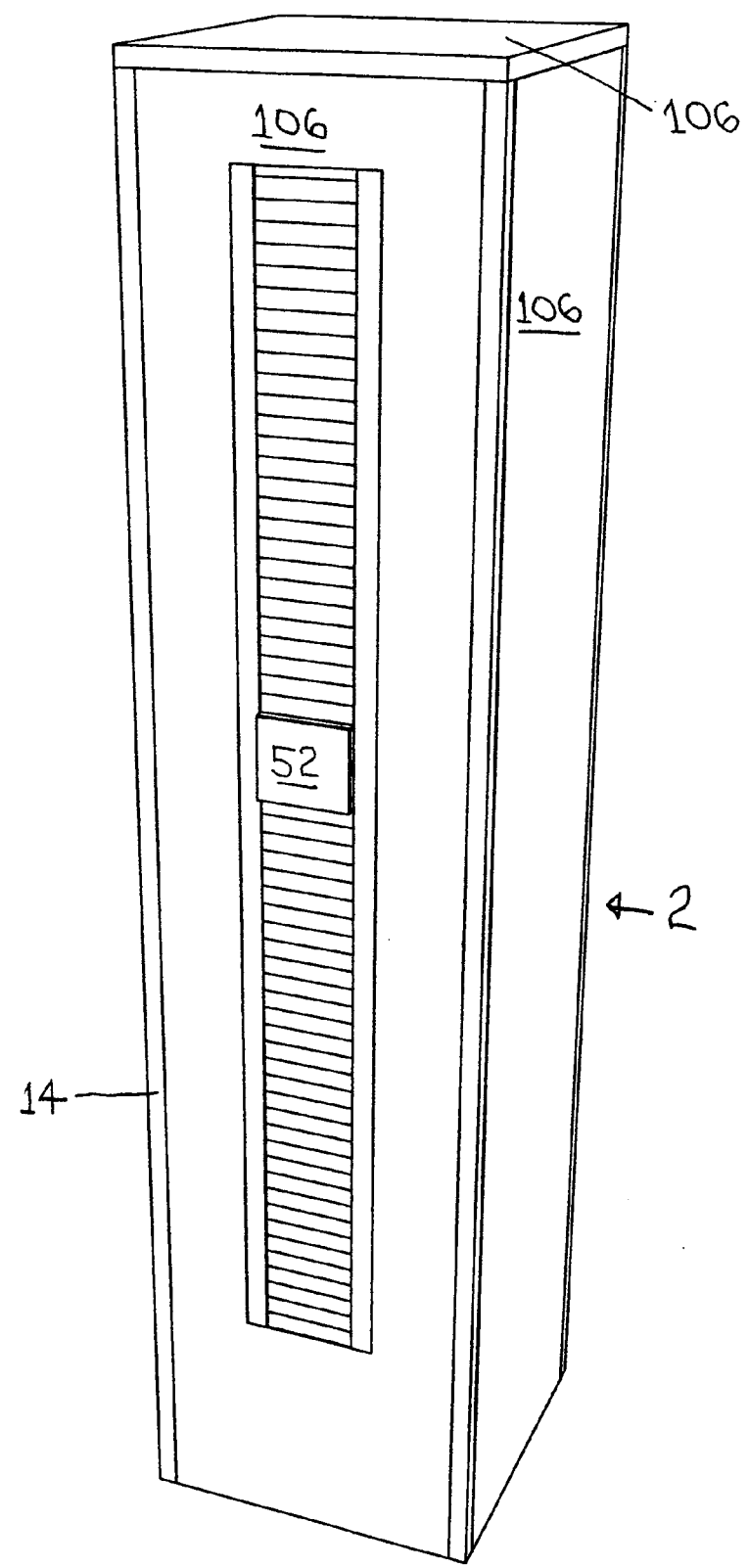

FIG. 9 shows a perspective view of the disk storage unit with the access panel door closed and with walls.

Figure 10:
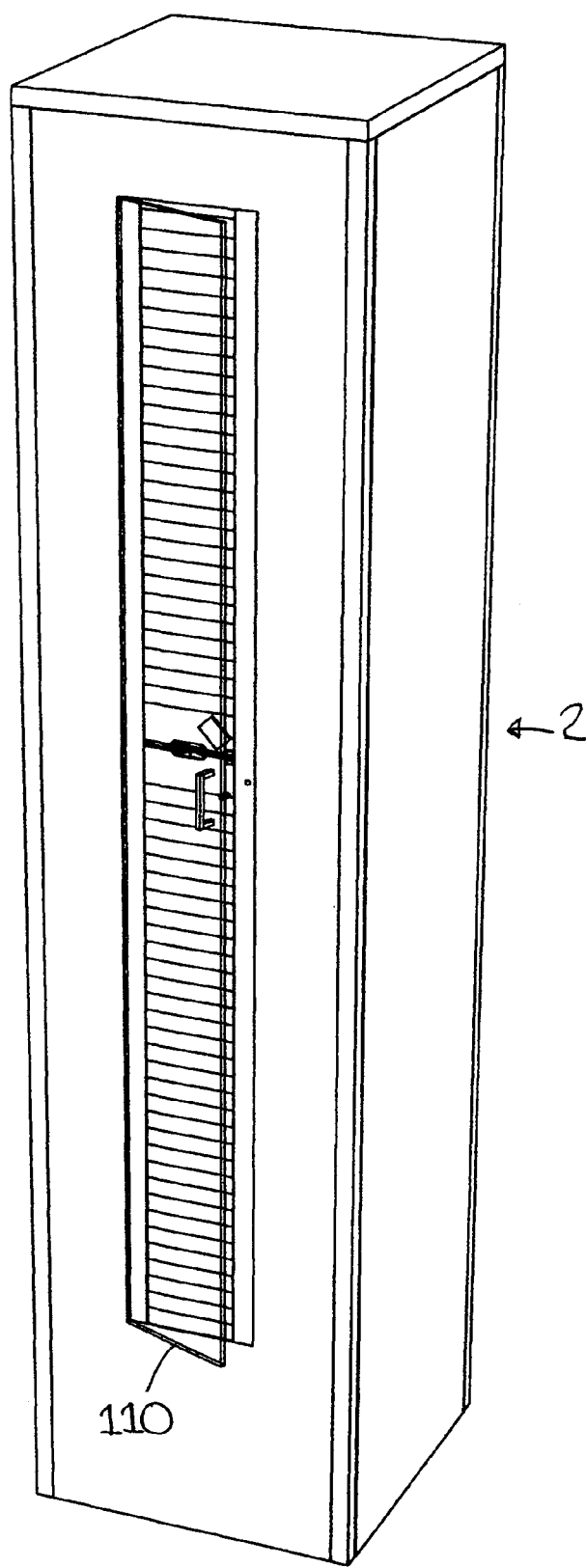

FIG. 10 shows a perspective view of the disk storage unit with a full-length door.

Figure 11A:
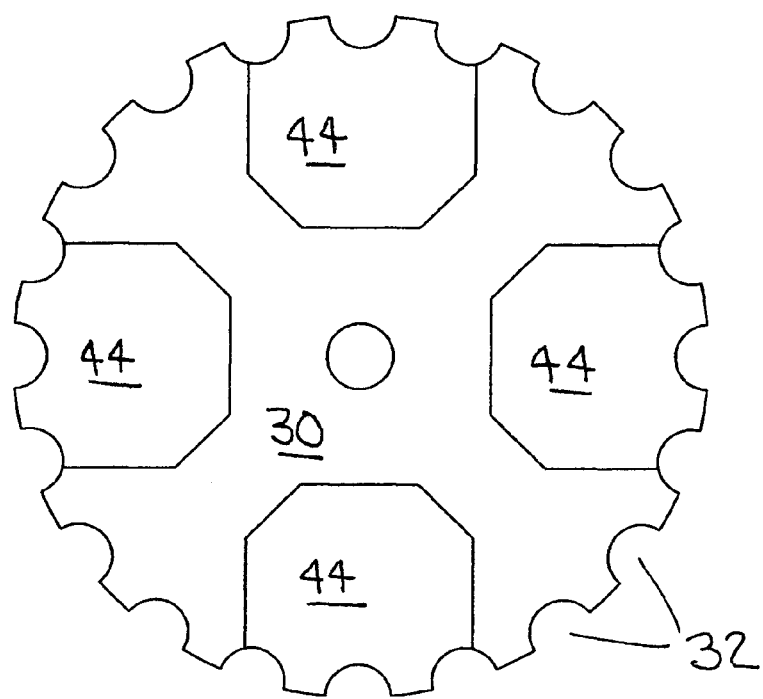

FIG. 11a provides an example of a storage element with 4 storage pockets and 20 access notches.

Figure 11B:
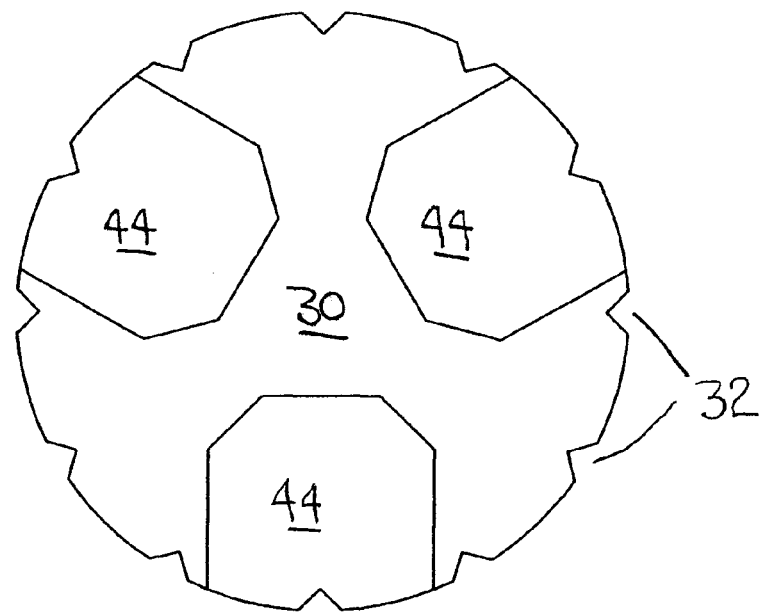

FIG. 11b shows an example of a storage element with 3 storage pockets and 12 access notches.

DRAWINGS -- REFERENCE NUMERAL

2 - disk storage unit
4 - storage cylinder
6 - access panel
8 - tambour
10 - tambour roller
12 - tambour guide
13 - access panel assembly
14 - frame
16 - storage cylinder motor
18 - motor mount
20 - guide brackets
22 - cylinder cross bracket
24 - rotatable base
25 - cover
26 - access panel motor
28 - roller L-bracket
30 - storage element
32 - vertical notch
44 - storage pocket
46 - primary notch
47 - pocket opening
48 - spacer notch
50 - stored object
52 - access panel door
54 - access door latch-sensor
56 - disk identification device
58 - direction sensor
60 - access panel opening
64 - drive screw
66 - drive housing
68 - linear bearing rod
69 - access panel positioning means
70 - motor sprocket

-continued

DRAWINGS -- REFERENCE NUMERAL

72 - cylinder sprocket
74 - chain
76 - cylinder reference sensor
78 - cylinder position sensor
80 - reference mark
82 - position markers
84 - motion controller
85 - cylinder positioning means
86 - computer
88 - display
90 - keypad
92 - mounting block
98 - shaft encoder
100 - limit sensor
104 - input/output board
106 - walls
110 - full-length door

DETAILED DESCRIPTION

Figure 1:
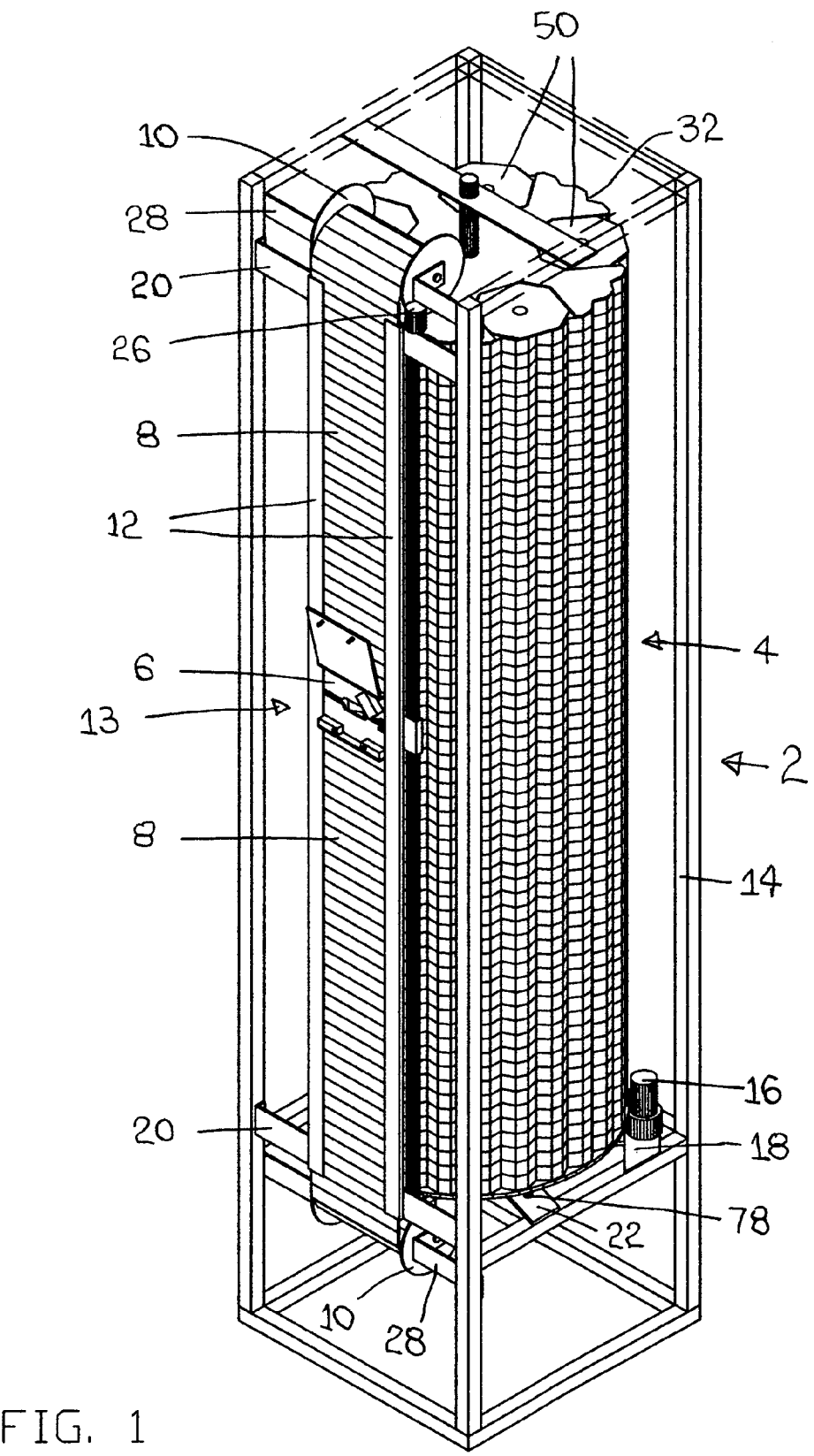
FIG. 1 shows a perspective view of the disk storage unit without walls, revealing the storage cylinder, access panel, tambours, motors, and frame.

FIG. 1 shows a disk storage unit 2 used for storage and retrieval of stored objects 50, which a user removes or inserts manually into a storage cylinder 4. A storage cylinder motor 16 rotates the storage cylinder 4 to bring a particular vertical notch 32 to the front of the disk storage unit 2. The storage cylinder 4 has a circular shape with 25 vertical notches 32 that run the full length of the storage cylinder 4. An access panel motor 26 moves an access panel 6 vertically until positioned in front of a stored object 50 selected for removal. An outer frame 14 supports the internal and enclosure components. A cover 25 (FIG. 6) tops the cylindrical column.

Figure 2:
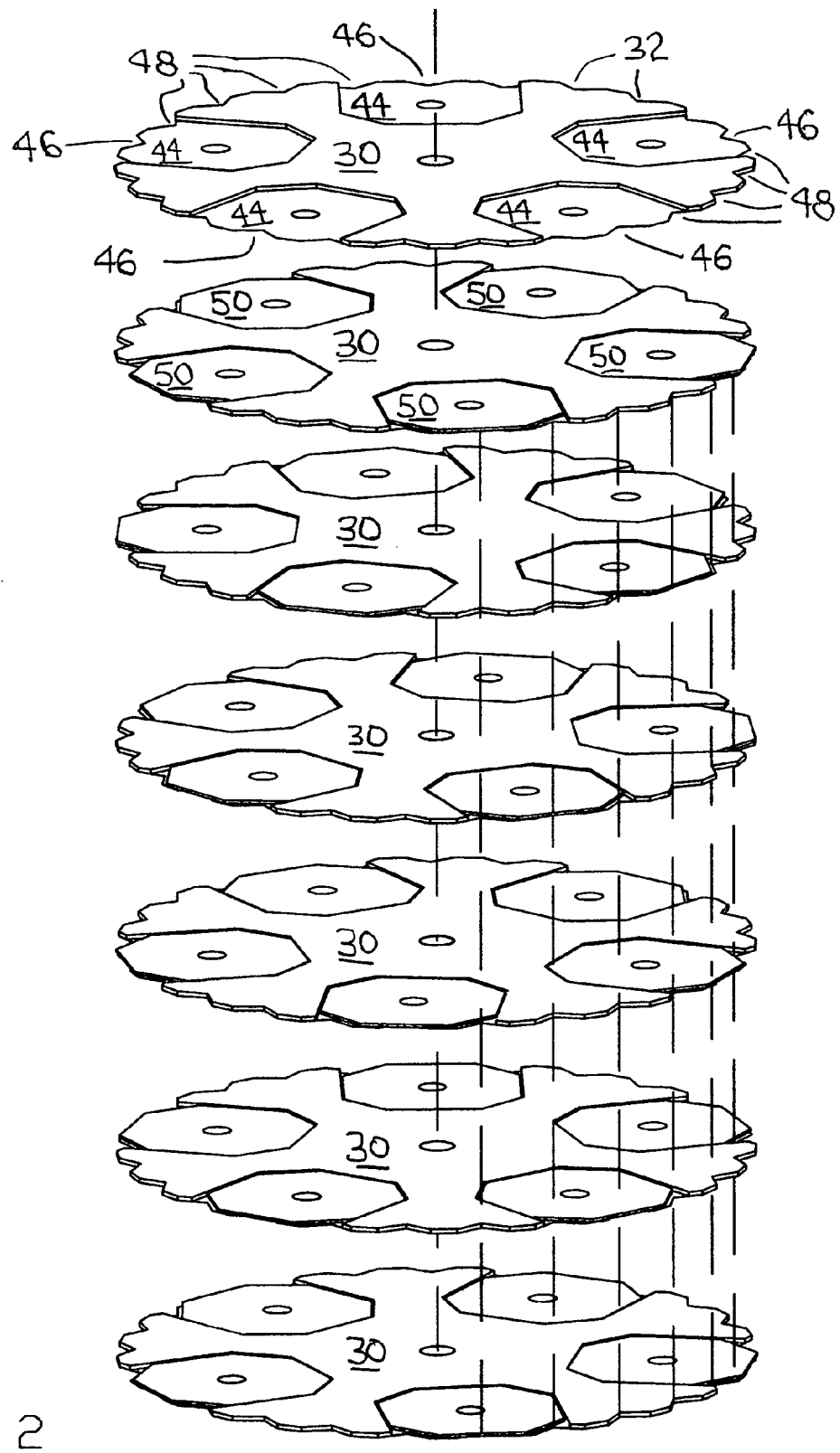
FIG. 2 is an exploded view, showing the spiral stacking sequence of 7 of the storage elements that make up the storage cylinder.

FIG. 2 provides an exploded view of part of the storage cylinder 4 shown in FIG. 1. FIG. 2 reveals that the storage cylinder 4 consists of a stack of storage elements 30, where each storage element 30 contains five storage pockets 44 on the same horizontal plane. The storage pockets 44 hold the stored objects 50. The top storage element 30 has empty storage pockets 44. All other storage elements 30 have storage pockets 44 containing stored objects 50. The storage elements 30 are stacked in a sequence that repeats after every five storage elements. The number of stacked storage elements 30 determines the height of the storage cylinder 4. FIG. 2 also shows that each storage element 30 has 25 evenly spaced notches around its periphery with 5 primary notches 46 centered at the outer edge of each of the 5 storage pockets 44. The remaining 20 notches are spacer notches 48 used for vertical spacing between stored objects 50. The storage elements 30 are stacked so that notches are vertically aligned forming vertical notches 32 that run the full vertical length of the storage cylinder.

FIG. 3A depicts an enlarged view of a middle section of the storage cylinder 4 shown in FIG. 1. FIG. 3A shows pocket openings 47 (through which stored objects 50 can be inserted and removed) and shows more clearly the vertical spacing between stored objects 50 in three of the vertical notches 32. The stacking sequence shown in FIG. 2 determines the spacing where each primary notch 46 and associated storage pocket 44 (shown in FIG. 2) have four spacer notches 48 both above and below it. If the storage elements 30 are ⅛ inch thick, the spacer notches 48 provide ½ inch of vertical space between stored objects 50 in each vertical notch 32. This separation provides enough space for a person's fingers to grab and remove the stored object 50.

FIG. 3B reveals a top partial view of some of the storage pockets and shows how the pockets overlap. One storage pocket 44 has a crosshatch pattern. The outlines of six other pockets 44, associated with adjacent vertical notches, are also shown, but without crosshatching. The overlapping pockets exist on different horizontal planes than the crosshatched pattern and therefore do not interfere with each other.

FIG. 4 shows a detailed perspective view of part of the access panel assembly 13 shown in FIG. 1. The access panel 6 moves up and down on two tambour guides 12 along with an upper and lower tambour 8 attached to the top and bottom edges of the access panel 6, respectively. FIG. 1 reveals how the other end of each tambour 8 attaches to a top or bottom tambour roller 10. The tambour rollers 10 are spring loaded (similar to window shade rollers) so that the tambours 8 roll on/off the rollers as the access panel 6 moves. Four roller L-brackets 28 attached to the frame 14 hold the tambour rollers 10 in place. As seen in FIG. 4, the access panel 6 connects to a drive housing 66 that houses a drive screw nut (not shown). An access panel motor 26 (FIG. 1) turns a drive screw 64 that moves the drive screw nut (not shown) which, in turn, moves the drive housing 66, access panel 6 and tambours 8 vertically. One may add a linear bearing rod 68 for additional strength. The access panel 6 and tambours 8 slide vertically on two tambour guides 12. As shown in FIG. 1, four guide brackets 20 are attached to the frame 14 and hold the tambour guides 12 in place. Taken together, the components used to move the access panel to a specific vertical position constitute an access panel assembly 13.

As shown in FIG. 4, the access panel 6 has an access panel opening 60 to limit a user's access to a single stored object 50. As described above, each vertical notch 32 (FIG. 3) on the storage cylinder 4 has about ½ inch spacing between its storage pockets 44. The access panel opening 60 is wider in the center to allow the user to reach in with two fingers and remove the stored object 50. The access panel 6 has an access panel door 52 that normally is latched shut by means of access door latch-sensors 54. The access door latch-sensors 54 not only latch and release the access panel door 52 but also provide a signal to an input/output board 104 (FIG. 7) to indicate the access panel door 52 status. A disk identification device 56 (e.g., a bar code or RFID reader) determines the identity of the stored object 50 selected for removal or insertion through the access panel opening 60. A direction sensor 58 gives the input/output board 104 (FIG. 7) information about whether the stored object 50 is being removed or inserted.

FIG. 5 shows a detailed perspective view of the bottom components of the disk storage unit 2. Here, a rotatable base 24 supports the storage cylinder 4, containing the stack of storage elements 30. A cylinder cross bracket 22, attached to the frame 14, supports the storage cylinder 4. A bearing between the rotatable base 24 and the cylinder cross bracket 22 is not shown. The center shaft of the storage cylinder 4 connects to a cylinder sprocket 72. A storage cylinder motor 16 (FIG. 1) mounted on motor mount 18 drives the rotatable base 24 and the storage cylinder 4 using a motor sprocket 70, a chain 74, and the cylinder sprocket 72. A cylinder position sensor 78 detects position markers 82 on the bottom of the rotatable base 24. A cylinder reference sensor 76 detects a reference mark 80 that establishes a "home" position. Taken together these components (used to rotate the storage cylinder 4 so that a specific vertical notch 32 aligns with the access panel opening 60) constitute a cylinder positioning means 85.

FIG. 6 shows a detailed perspective view of the top part of the disk storage unit 2 and displays the outline of cover 25 (in dashed lines) and the access panel positioning means 69 used in this invention. A mounting block 92 supports the access panel motor 26 and holds the ends of both the drive screw 64 and linear bearing rod 68. The drive housing 66 is shown in its uppermost position next to a limit sensor 100. A computer 86 (FIG. 7) reads the information from the limit sensor 100 to initialize the position of the access panel 6 (FIG. 4). The access panel motor 26 has a shaft encoder 98 (FIG. 7) connected to the input/output board 104 (FIG. 7) to maintain position.

FIG. 7 shows a block diagram of the electronic components of the disk storage unit 2. Lines between blocks represent signal paths that, in most cases, correlate with electrical cables. A computer 86 controls cylinder positioning means 85 (FIG. 5). The computer 86 serves as an interface (taking user requests and generating commands to the motion controller 84, which drives the two motors). Feedback from the cylinder position sensor 78 and shaft encoder 98 determines direction and distance of travel. After both the storage cylinder 4 and access panel 6 reach the desired position, the computer 86 releases the access door latch-sensor 54 and then collects information from the disk identification device 56 for the stored object 50 being removed or inserted. The direction sensor 58 determines if the stored object 50 is being removed or inserted.

FIG. 8 and FIG. 9 show the disk storage unit 2 with walls 106. The access panel door 52 is open in FIG. 8 and closed in FIG. 9. The disk storage unit 2 as shown does not depict the display 88 or keypad 90 (FIG. 7).

FIG. 10 shows another embodiment of the storage unit 2 with a full-length door 110.

OPERATION

One may use storage unit 2 for DVD, CD, or computer game rentals or sales. For these applications, computer 86 has a display 88 and keypad 90 to allow the user to select the disk for rent or sale. As shown in FIG. 7, the computer 86 translates this information into commands for the motion controller 84.

A database available to the computer 86 matches the description of the stored object 50 selected by the user (e.g. movie title) to the physical location of that object. The computer 86 then directs the motion controller 84 to drive the storage cylinder motor 16 and access panel motor 26 so that the storage cylinder 4 and access panel 6 move toward that location. The computer 86 monitors the cylinder position sensor 78 and the shaft encoder 98; it stops the motors when storage cylinder 4 reaches the correct vertical notch 32 and the access panel 6 is at the correct vertical position. The computer 86 then unlatches the access panel door 52 by activating access door latch-sensor 54, allowing the user to open the access panel door 52 and remove or insert the disk. The user then closes the door. If the apparatus is in use as a disk rental return, the transaction terminates when the access panel door 52 closes and latches. For safety considerations, the computer 86 will not command the motion controller 84 to move either the access panel 6 or storage cylinder 4 until the access panel door 52 is closed and latched. All other interactions between the user and computer 86 needed to complete the transaction, such as title selection and credit card approval, are similar to other vending transactions of this type and are well known.

ADVANTAGES

This invention provides high storage density with a minimal footprint, a great benefit when floor space is at a premium. By simplifying the selection mechanics and by eliminating the automated removal and insertion functions, one reduces manufacturing costs and improves machine reliability.

VARIATIONS

Although the above description contains many specificities, these should not be construed as limiting the scope of the invention but as merely providing illustrations of some of the preferred embodiments of this invention. For example:

- The shape of the storage elements 30 could vary—e.g. the perimeter could be circular and the vertical notches could be rounder.
- The shape of the storage pocket 44 could vary.
- The shape of access panel opening 60 could vary.
- The diameter of the storage elements 30 and the storage cylinder 4 could vary.
- As shown in FIG. 11a and FIG. 11b, the number of storage pockets 44 in one storage element 30 could vary as could the number of vertical notches 32 used to access the stored objects 50.
- One could change the stacking sequence of the storage elements 30—e.g. the primary notch 46 could be shifted 1 vertical slot instead of 2 as shown in FIG. 2. Other stacking sequences are also possible as long as they result in a vertical separation between stored objects 50 large enough to remove a disk manually.
- One could build the user interface components into the enclosures shown in FIG. 8 and FIG. 9, resulting in a stand-alone rental/sales unit.
- One could manufacture the storage cylinder 4 or segments of the storage cylinder 4 as a single unit rather than from stacked storage elements 30 shown in FIG. 2 and FIG. 3.
- Several storage cylinders 4 could be mounted on a rotatable platter to bring a specific cylinder to the access panel before being rotated itself to bring a specific vertical notch 32 to the access panel. Multiple storage cylinders 4 will greatly increase the capacity of the overall disk storage unit. Alternatively, the storage cylinders 4 could be shorter, reducing the height of the unit, but maintaining the same storage capacity.
- One could replace the tambour 8 with telescoping overlapping panels or with flexible belt material. One can eliminate the tambour rollers 10 by extending the tambour guides 12 over the top and bottom of the storage cylinder 4 to accommodate the full range of access panel 6 movement.

CONCLUSIONS, RAMIFICATIONS, SCOPE

This invention provides high storage density with a minimal footprint. It rewards customers with a large selection of DVDs and satisfies storeowners by providing the lowest square footage footprint of any other DVD dispenser. Furthermore, its large storage capacity results in the lowest cost per stored DVD. In addition, this invention allows users to remove and reinsert disks into the disk storage unit manually, reducing the machine's complexity. Also, by using a movable panel for DVD access, fewer parts are required. Lastly, by incorporating these attributes into a single unit, the invention provides high-density storage, reduces manufacturing costs, and improves machine reliability.

I claim:

1. A storage cylinder for digital video disks, compact disks, and other similarly shaped stored objects comprising:
   a) a storage cylinder with a shape approximating that of a right circular cylinder where said storage cylinder has a lateral surface and further where said storage cylinder has vertical notches evenly spaced around its cylindrical perimeter that run vertically with approximately uniform depth along the entire vertical length of said lateral surface;
   b) a plurality of storage pockets where each said storage pocket has a top and bottom surface such that the dimension of the distance between said top and bottom surfaces is much less than its width and depth dimensions and where said top and bottom surfaces are horizontal and where one end of each of said storage pockets intersect with said lateral surface and at least one of said vertical notches forming a corresponding pocket opening, and where the center of said pocket opening aligns with the center of one of said vertical notches and where a plurality of said storage pockets are centrally aligned along one of said vertical notches and further that said storage pockets centrally aligned along one of said vertical notches are placed at regular vertical intervals along said vertical notch with sufficient spacing between said pocket openings so that the pocket openings are adapted to allow for removal and insertion of stored objects and further where said pockets centrally aligned along one said notch are positioned so they do not intersect with pockets that are centrally aligned along other said vertical notches and where said pockets centrally aligned along one said vertical notch partially overlap pockets centrally aligned with at least three adjacent vertical notches when viewed along the cylindrical axis of said storage cylinder and further where at least 2 storage pockets are on the same horizontal plane.

2. The storage cylinder of claim 1 wherein said storage cylinder further comprises a rotatable base to allow rotation of said storage cylinder.

3. The storage cylinder of claim 2 housed in a storage unit which comprises walls, a cylinder positioning means, and an access panel assembly whereby the storage cylinder can be rotated and the access panel positioned vertically to allow access to any selected said storage pocket.

4. A disk storage cylinder for digital video disks, compact disks, and other similarly shaped stored objects comprising:
   a) a storage cylinder with a shape approximating that of a right circular cylinder where said storage cylinder has a lateral surface and further where said storage cylinder has vertical notches evenly spaced around its cylindrical perimeter that run vertically with approximately uniform depth along the entire vertical length of said lateral surface;
   b) a plurality of storage pockets where each said storage pocket has a top and bottom surface such that the dimension of the distance between said top and bottom surfaces is much less than its width and depth dimensions and where said top and bottom surfaces are horizontal and where one end of each of said storage pockets intersect with said lateral surface and at least one of said vertical notches forming a corresponding pocket opening, and where the center of said pocket opening aligns with the center of one of said vertical notches and where a plurality of said storage pockets are centrally aligned along one of said vertical notches and further that said storage pockets centrally aligned along one of said vertical notches are placed at regular vertical intervals along said vertical notch with sufficient spacing between said pocket openings so that the pocket openings are adapted to allow for removal and insertion of stored objects and where said pocket openings corresponding to pockets centrally aligned along one of said vertical notches overlap said pocket openings corresponding to pockets centrally aligned along at least one adjacent vertical notch when viewed along the cylindrical axis of said storage cylinder and where at least two of said storage pockets are on the same horizontal plane.

5. The storage cylinder of claim 4 wherein said storage cylinder further comprises a rotatable base to allow rotation of said storage cylinder.

6. The storage cylinder of claim 5 housed in a storage unit which comprises walls, a cylinder positioning means, and an access panel assembly whereby the storage cylinder can be rotated and the access panel positioned vertically to allow access to any selected said storage pocket.

* * * * *